(12) United States Patent
Chapman et al.

(10) Patent No.: US 6,780,920 B2
(45) Date of Patent: Aug. 24, 2004

(54) FORMULATION SUITABLE FOR INK RECEPTIVE COATINGS

(75) Inventors: David Monroe Chapman, Ellicott City, MD (US); Demetrius Michos, Columbia, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/305,041

(22) Filed: Nov. 26, 2002

(65) Prior Publication Data

US 2003/0181566 A1 Sep. 25, 2003

Related U.S. Application Data

(62) Division of application No. 09/112,540, filed on Jul. 9, 1998.

(51) Int. Cl.⁷ .............................. C08K 3/36; C08K 3/22; B01F 3/12; C01B 33/12
(52) U.S. Cl. ...................... 524/493; 524/430; 516/79; 516/80
(58) Field of Search .................... 524/492, 493, 524/430, 555; 516/79, 80

(56) References Cited

U.S. PATENT DOCUMENTS

| | | |
|---|---|---|
| 2,244,325 A | 6/1941 | Bird ........................... 252/313 |
| 2,731,326 A | 1/1956 | Alexander et al. ............. 23/182 |
| 2,741,600 A | 4/1956 | Allen ...................... 252/313.2 |
| 2,892,797 A | 6/1959 | Alexander et al. .......... 252/313 |
| 2,947,713 A | 8/1960 | Jordan et al. .................. 260/19 |
| 3,007,878 A | 11/1961 | Alexander et al. .......... 252/313 |
| 3,012,973 A | 12/1961 | Atkins ........................ 252/313 |
| 3,013,897 A | 12/1961 | Cupery et al. ................ 117/46 |
| 3,035,002 A | 5/1962 | Brasure et al. ............... 260/23 |
| 3,174,945 A | 3/1965 | Taylor, Jr. et al. ............ 260/40 |
| 3,185,301 A | 5/1965 | Folkins et al. ................. 209/3 |
| 3,354,114 A | 11/1967 | Doyle ......................... 260/40 |
| 3,453,127 A | 7/1969 | Marotta et al. .............. 106/192 |
| 3,574,135 A | 4/1971 | Sampson et al. ........... 252/317 |
| 3,591,518 A | 7/1971 | McMillan ................... 252/313 |
| 3,607,774 A | 9/1971 | Cummings ................. 252/313 |
| 4,122,161 A | 10/1978 | Wason ......................... 424/49 |
| 4,157,920 A | 6/1979 | Wason et al. ............... 106/292 |
| 4,226,743 A | 10/1980 | Seese et al. ................. 252/463 |
| 4,228,260 A | 10/1980 | Scholten et al. ............. 526/106 |
| 4,383,057 A | 5/1983 | Yamamoto et al. ......... 523/333 |
| 4,438,170 A | 3/1984 | McCue ....................... 428/207 |
| 4,451,388 A | 5/1984 | Payne ........................ 252/313 |
| 4,478,910 A | 10/1984 | Oshima et al. ............. 428/331 |
| 4,544,604 A | 10/1985 | Usui et al. .................. 428/402 |
| 4,678,742 A | 7/1987 | Tamagawa et al. ......... 430/523 |
| 4,780,356 A | 10/1988 | Otouma et al. ............. 428/212 |
| 4,879,166 A | 11/1989 | Misuda et al. .............. 428/212 |
| 4,902,568 A | 2/1990 | Morohoshi .................. 428/331 |
| 4,915,923 A | 4/1990 | Ogawa et al. .............. 423/335 |
| 4,931,491 A | 6/1990 | Savin ......................... 523/443 |
| 4,954,220 A | 9/1990 | Rushmere ................. 162/168.3 |
| 4,983,369 A | 1/1991 | Barder et al. ............... 423/338 |
| 4,989,794 A | 2/1991 | Askew et al. ................ 241/16 |
| 5,030,286 A | 7/1991 | Crawford et al. ........... 106/435 |
| 5,083,712 A | 1/1992 | Askew et al. ................ 241/16 |
| 5,145,811 A | 9/1992 | Lintz et al. .................... 501/95 |
| 5,190,805 A | 3/1993 | Atherton et al. ............ 428/195 |
| 5,214,085 A | 5/1993 | Patel et al. ................. 524/102 |
| 5,277,888 A | 1/1994 | Baron et al. ................ 423/335 |
| 5,278,221 A | 1/1994 | Siddiqui ..................... 524/493 |
| 5,318,628 A | 6/1994 | Matijevic et al. ........... 106/499 |
| 5,320,898 A | 6/1994 | Yoshida et al. ............. 428/195 |
| 5,344,489 A | 9/1994 | Matijevic et al. ........... 106/442 |
| 5,372,884 A | 12/1994 | Abe et al. ................... 428/331 |
| 5,403,955 A | 4/1995 | Farooq ........................ 564/15 |
| 5,420,190 A | 5/1995 | Gane .......................... 524/446 |
| 5,454,864 A * | 10/1995 | Whalen-Shaw ............ 106/416 |
| 5,494,759 A | 2/1996 | Williams et al. ............ 428/514 |
| 5,506,182 A | 4/1996 | Yamagishi et al. ........... 502/66 |
| 5,513,803 A | 5/1996 | Czekai et al. ................ 241/16 |
| 5,589,150 A | 12/1996 | Kano et al. ................. 423/338 |
| 5,605,750 A | 2/1997 | Romano et al. .......... 428/304.4 |
| 5,610,230 A | 3/1997 | Yoshida et al. ............. 524/730 |
| 5,612,281 A | 3/1997 | Kobayashi et al. ......... 503/227 |

(List continued on next page.)

FOREIGN PATENT DOCUMENTS

| | | |
|---|---|---|
| CA | 609186 | 11/1960 |
| CA | 609190 | 11/1960 |
| DE | 19534327 A1 * | 2/1996 |
| EP | 0 468 070 B1 | 11/1993 |
| EP | 0 803 374 A2 | 10/1997 |
| EP | 879709 | 11/1998 |
| JP | 62111782 | 5/1987 |
| JP | 6199034 | 7/1994 |
| JP | 8157643 | 6/1996 |
| JP | 9-263041 | 10/1997 |
| JP | 9-272257 | 10/1997 |
| JP | 9-286162 | 11/1997 |
| WO | WO 97/01447 | 1/1997 |
| WO | WO 97/22670 | 6/1997 |
| WO | WO 98/55328 | 12/1998 |

OTHER PUBLICATIONS

English Translation of DE 19534327 (1996).*

Primary Examiner—Callie Shosho
(74) Attorney, Agent, or Firm—William D. Bunch

(57) ABSTRACT

Formulations comprising novel porous metal oxide particles and binder are particularly suitable for ink receptive coatings, e.g., for ink jet papers and films. The metal oxide particles used in this application have a porous structure that differs significantly from the nonporous silica colloids. The particles have a median particle size in the range of about 0.05 to about 3 microns and porosity such that when an aqueous dispersion of the particles is dried at least 0.5 cc/g of pore volume is from pores having a pore size of 600 Å or less. The particles also have a viscosity derived pore volume of at least 0.5 cc/g.

Formulations comprising particles having a zeta potential of +20 mV are also disclosed.

6 Claims, 3 Drawing Sheets

U.S. PATENT DOCUMENTS

| | | | |
|---|---|---|---|
| 5,616,409 A | 4/1997 | Matsuda et al. | 428/323 |
| 5,639,412 A | 6/1997 | Anderson et al. | 252/313.2 |
| 5,660,928 A | 8/1997 | Stokes et al. | 428/331 |
| 5,720,806 A | 2/1998 | Fujii et al. | 106/483 |
| 5,804,293 A | 9/1998 | Nehmsmann et al. | 428/307.3 |
| 5,882,388 A | 3/1999 | Adair et al. | 106/31.6 |
| 5,885,638 A | 3/1999 | Takayanagi et al. | 426/271 |
| 5,962,124 A * | 10/1999 | Yoshino et al. | 428/328 |
| 5,965,244 A | 10/1999 | Tang et al. | 428/195 |
| 6,000,794 A * | 12/1999 | Kondo et al. | 347/105 |
| 6,129,785 A | 10/2000 | Schliesman et al. | 106/482 |
| 6,140,406 A | 10/2000 | Schliesman et al. | 524/493 |
| 6,150,289 A | 11/2000 | Chen et al. | 501/148 |
| 6,187,430 B1 | 2/2001 | Mukoyoshi et al. | 428/331 |
| 6,342,293 B1 * | 1/2002 | Nakahara et al. | 428/315.7 |

* cited by examiner

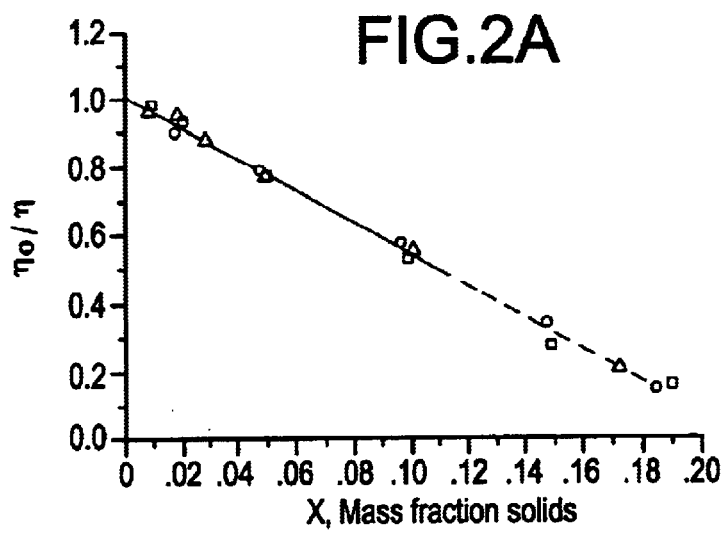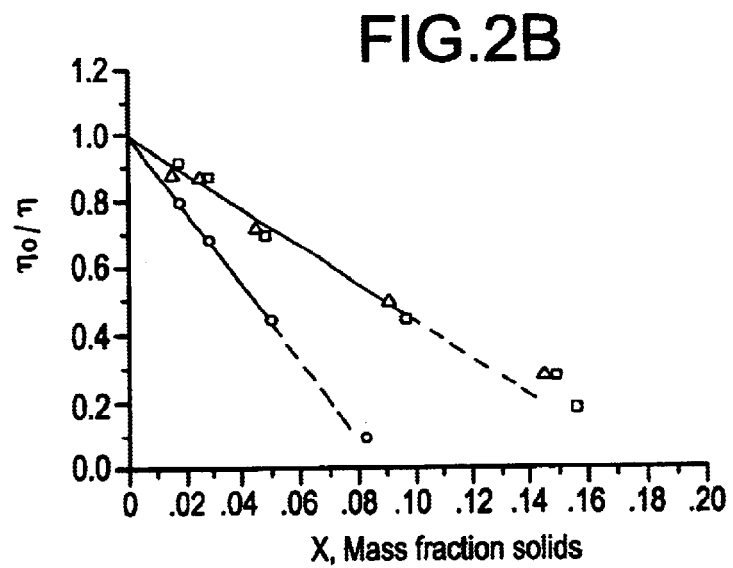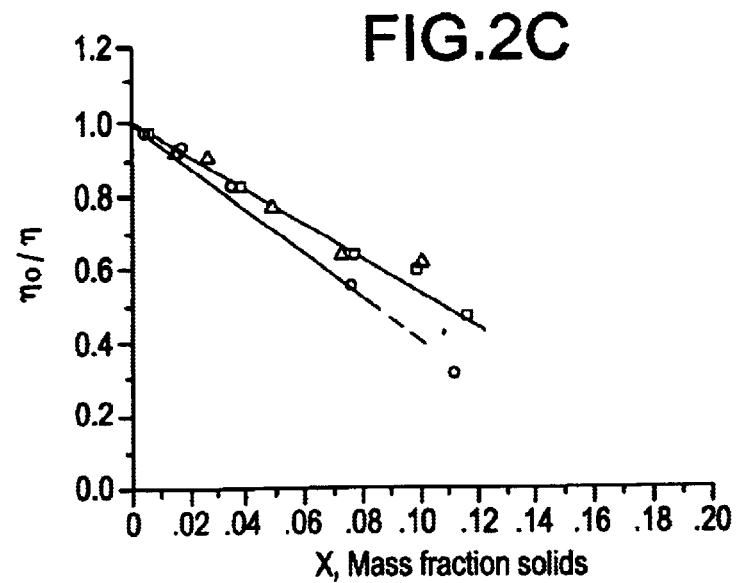

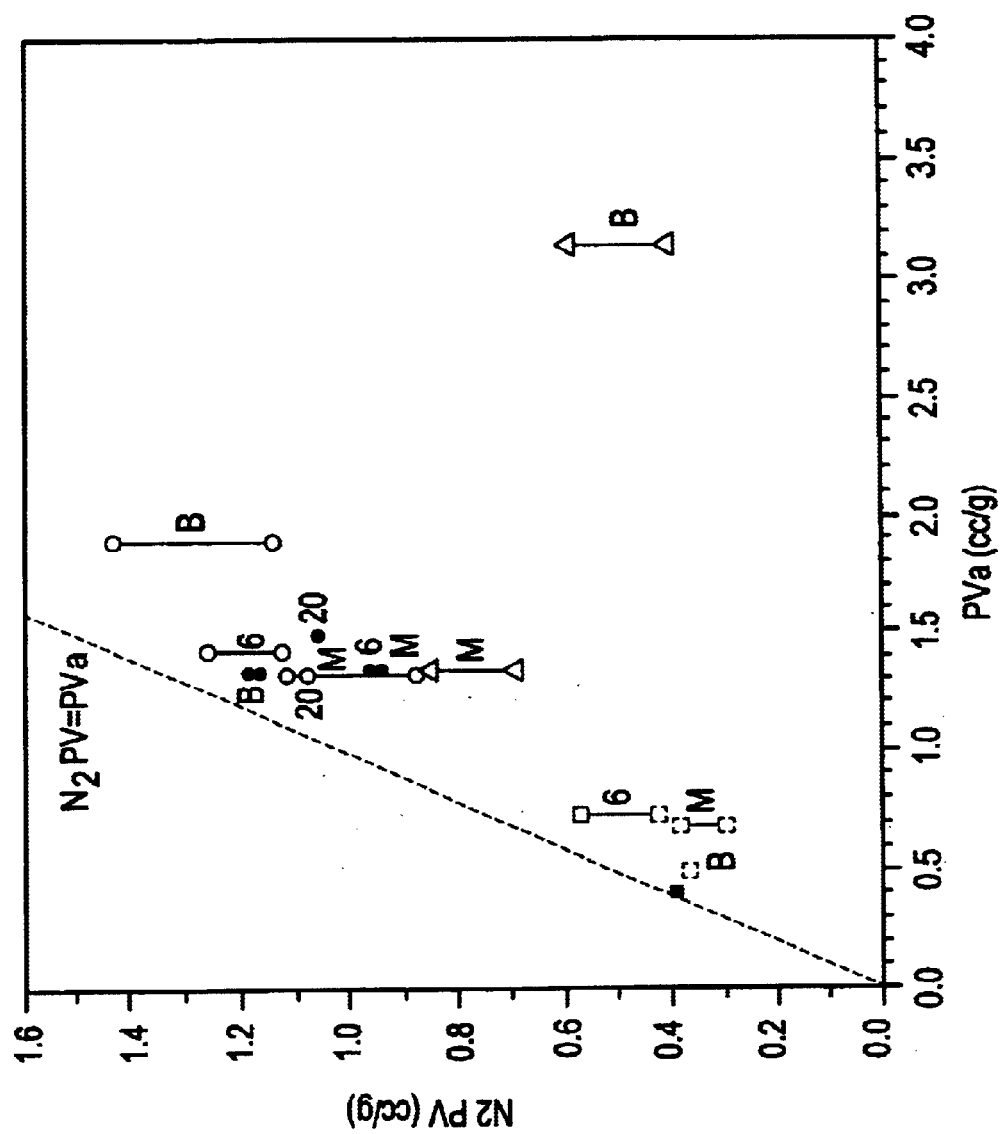

FORMULATION SUITABLE FOR INK RECEPTIVE COATINGS

This is a division of application Ser. No. 09/112,540, filed Jul. 9, 1998.

BACKGROUND OF THE INVENTION

This invention relates to formulations comprising inorganic oxide particles. In particular, this invention relates to ink receptive coating formulations for paper comprising a novel porous, fine inorganic oxide which provides excellent ink absorption properties, and if desired, glossy finishes.

Ink receptive coatings typically contain various proportions of inorganic pigments and binder(s). The proportions of these components affect the properties of these coatings, e.g., ink absorption properties. One means of characterizing the proportion of inorganic pigment relative to the proportion of binder is by the pigment volume concentration, or PVC. The definition of pigment volume concentration (PVC) is: $100*V_p/(V_p+V_b)$, where $V_p$ is the volume of the pigment and $V_b$ is the volume of the binder.

When a coating is formulated at low PVC, the binder constitutes the continuous phase of the coating within which pigment particles are dispersed. When a coating is formulated at high PVC, the binder phase is no longer a continuous phase, that is, there is not enough binder to fill the voids between packed and semi-rigid or rigid pigment particles. The proportion at which the binder is no longer considered the continuous phase is referred to in the art as the critical pigment volume concentration (CPVC). At proportions above CPVC, a network of interparticle pores form between the close packed particles, and these interparticle pores become reservoirs for ink that is subsequently applied to the dried coating.

It also is well known in the art that glossy and permeability properties of coatings comprising inorganic pigment and binder depend on the PVC. See *Outlines of Paint Technology* 3rd ed., W. M. Morgans, Halsted Press (a division of John Wiley & Sons, Inc.) New York, N.Y., 1990, p.7. When a coating is formulated below the CPVC, a matte effect is created by imparting surface roughness and can be generally attained when the pigment particle size is large when compared to the coating thickness. Relatively glossy coatings can be achieved when the pigment particles are small when compared to the coating thickness. Thus, matte finishes and coating gloss can be controlled by judicious choice of pigment particle size in relation to the coating film thickness. However, unless the binder is hygroscopic, such coatings will be relatively impermeable to water. For an ink-jet printing application with aqueous inks, such a coating would suffer from the shortcoming of relatively long ink dry-time. A key attribute of ink-receptive coatings is the ability to absorb the ink fluid rapidly so that the image becomes fixed to the media as quickly as possible. This minimizes smudging.

One known formulation comprising hygroscopic binders is an ink-receptive coating formulated at low PVC using colloidal silica as the pigment in conjunction with hygroscopic binders such as PVOH. These formulations generally result in relatively glossy coatings and the hygroscopic binders absorb moisture via partial solubility of the ink-fluid. The colloidal silica in this instance serves to modify the coating properties to improve the image characteristics once the coatings is printed. However, colloidal silica is non-porous and coatings prepared from colloidal silicas are relatively dense. Such a coating therefore lacks capacity to absorb large quantities of liquid ink. Furthermore, ink-drytimes are relatively slow.

When coatings are formulated at high PVC (and specifically, above the CPVC), it is typical to observe very different gloss and moisture permeability properties than when formulated below the CPVC. At high PVC, a network of interstitial void space, or pores between the particles, is created by imperfect packing of the particles and the lack of a suitable amount of binder to fill the interstitial voids. Such coatings tend to display a high degree of moisture permeability because of liquid flow through the interstitial pores, which is desirable for the ink-receptive coating application. However, the gloss of such coatings is usually relatively low because the surface exhibits a degree of roughness that is related to the pigment particle size. It is possible to obtain relatively glossy coatings in this system, but relatively small pigment particles are necessary and typically relatively non-porous particles are used. For example, colloidal silica described in European Patent Application 803,374 can be used for glossy applications. Colloids derived from fumed silica also have been used for this purpose, but those materials are also non-porous.

Other pigments such as clays, aluminas, diatomaceous earth, precipitated silicas, etc., disclosed in U.S. Pat. Nos. 4,460,637 and 5,030,286, are used as well. While some of these pigments do have internal porosity, that porosity is subject to substantial reduction when the coating containing the pigments is applied and dried.

Accordingly, there is a need to provide pigments for glossy ink receptive coatings in which the inorganic particles contain internal porosity, regardless of the coating PVC. It also is desirable to have pigment porosity and hence coating porosity which is not as affected by external factors, such as shear, and is reliably present even after the pigment and coating is processed and dried.

SUMMARY OF THE INVENTION

The formulations of this invention comprise binder and porous inorganic oxide particles or pigments which have a median particle size in the range of 0.05 to about 3 microns. Unlike prior art colloidal particles, the particles of this invention have a porous structure such that at least about 0.5 cc/g of the pore volume is from pores having a pore size of 600 Å or less. Porosity from pores less than 600 Å is referred to herein as internal porosity, i.e., porosity present in the particles themselves. Indeed, the internal porosity is reflected by a "viscosity derived pore volume", defined later below, of at least about 0.5 cc/g. There also are embodiments comprising silica gel particles in which at least about 0.7 cc/g and at least 0.9 cc/g of pore volume is from pores having sizes less than 600 Å. In these embodiments, at least 80% of the pore volume is from pores having pore sizes less than 300 Å.

The internal porosity of the particles in this invention is relatively stable and unlike prior art precipitated silicas is less susceptible to complete collapse under capillary pressures created when the water evaporates from the dispersion during drying.

The formulations can be coated onto substrates and dried to form a porous layer which is particularly suitable as an ink receptive layer, e.g., ink jet paper. The dried layer resulting from the formulation generally has good ink absorption properties. Embodiments comprising particles having a median particle size in the range of 0.05 to 1 micron can be used to prepare relatively high gloss finishes, particularly for photorealistic printing.

Figure 1:
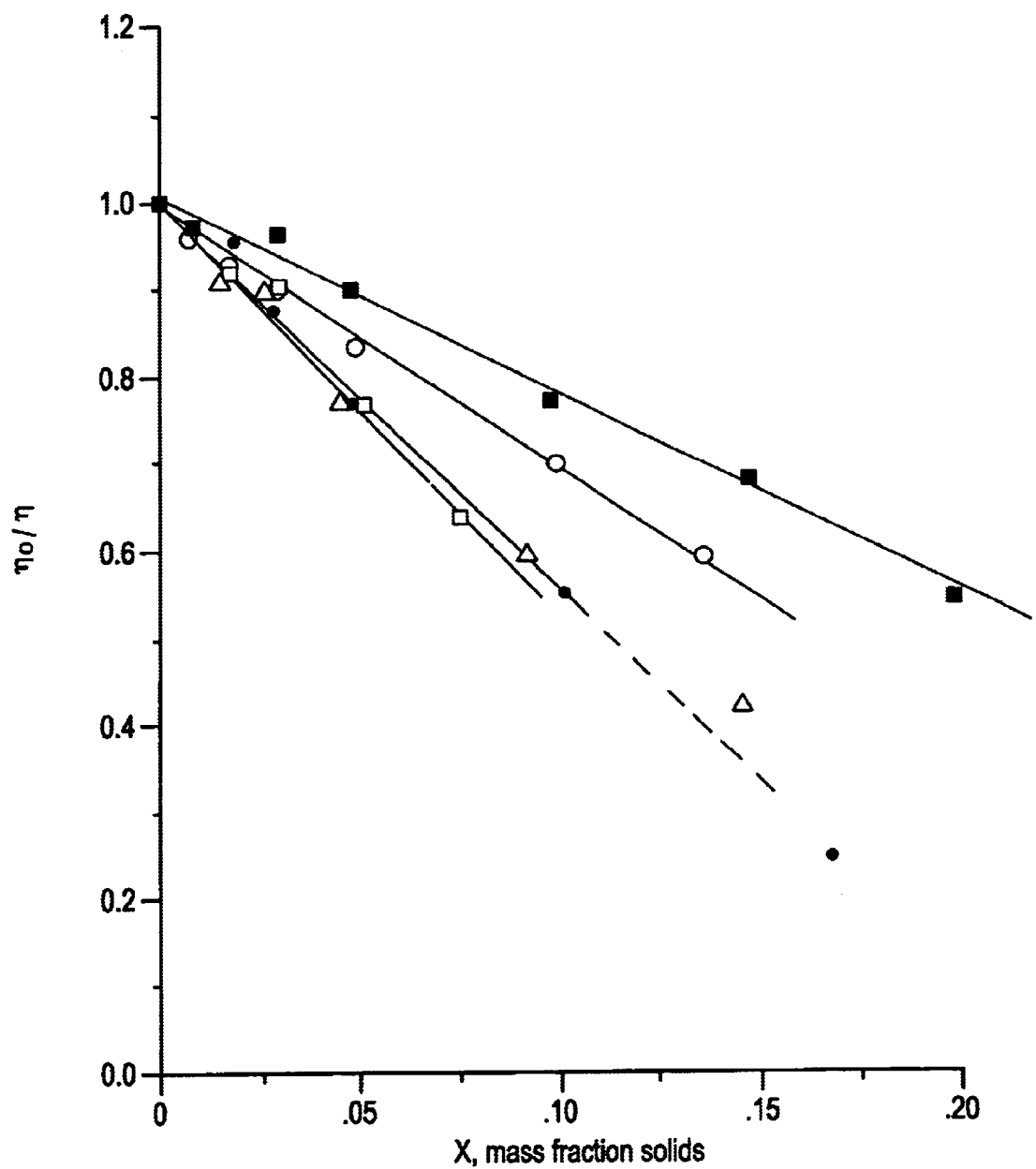
FIG. 1 shows a graph of $$\frac{\eta_0}{\eta}$$

versus mass fraction solids for dispersions of particles used in several embodiments of the invention and prior art colloidal silica, wherein $\eta$ is the viscosity of the dispersions illustrated and $\eta_0$ is the viscosity of water. Mass fraction solids include undissolved particles and does not include dissolved salts.

FIG. 2A shows a graph of $$\frac{\eta_0}{\eta}$$

versus mass fraction solids wherein $\eta$ is the viscosity of dispersions of particles used in one embodiment of the invention wherein the particles comprise a hydrous silica gel, and $\eta_0$ is the viscosity of water. (○) represents data for viscosity and loadings before milling. (□) represents data for viscosity and loadings after being milled, and (Δ) represents data for viscosities and loadings of dispersions after being milled and centrifuged at 600 G's.

FIG. 2B is a graph of the same data for precipitated silica commercially available as Zeothix™177, where (○) and (□) represents the same type of data indicated for FIG. 2A. (Δ) represents data for a dispersion which had been milled and centrifuged at 2,000 G.

FIG. 2C is a graph of the same data generated for FIG. 2A, but is generated for a precipitated silica commercially available as FK310 from Degussa. (○), (□) and (Δ) represent the same type of data indicated for FIG. 2A.

FIG. 3 is graph correlating viscosity derived pore volume (PVa) and dried pore volume measurements for particles used in the invention.

DETAILED DESCRIPTION OF THE PREFERRED EMBODIMENTS (1) Preparation of Inorganic Oxide Particles The inorganic oxide particles used in this invention can be prepared from conventional inorganic oxide materials. Suitable inorganic oxides include precipitated inorganic oxides and inorganic oxide gels. These inorganic oxides are referred to herein as "parent inorganic oxides," "parent particles" or "parent dispersions". Amorphous precipitated silica and silica gels are particularly suitable parent inorganic oxides. The particles can also be prepared from mixed inorganic oxides including $SiO_2.Al_2O_3$, $MgO.SiO_2.Al_2O_3$. The mixed inorganic oxides can be prepared by conventional blending or cogelling procedures.

Suitable inorganic oxide gels include, but are not limited to, gels comprising $SiO_2$, $Al_2O_3$, $AlPO_4$, $MgO$, $TiO_2$, and $ZrO_2$,. The gels can be hydrogels, aerogels, or xerogels. A hydrogel is also known as an aquagel which is formed in water and as a result its pores are filled with water. A xerogel is a hydrogel with the water removed. An aerogel is a type of xerogel from which the liquid has been removed in such a way as to minimize collapse or change in the gel's structure as the water is removed. Silica gels commercially available as Syloid® grade gels, e.g., grades 74, 221, 234, 244, W300, W500, and Genesis™ silica gels are suitable parent inorganic oxides.

Gels are well known in the art. See Iler's "The Chemistry of Silica", p. 462 (1979). Gel, e.g. silica gel, particles are distinguishable from colloidal silica or precipitated silica particles. For example, colloidal silica is prepared as a slurry of dense, non-porous silica particles. Colloidal silica particles typically are smaller than 200 nm (0.2 micron). As mentioned earlier, these particles do not have internal porosity. On the other hand, typical precipitated particles have some internal porosity. In some cases, the internal porosity in those particles, however, largely collapses under capillary pressure created by receding menisci of water as the water evaporates during drying. The conditions for making colloidal silica and precipitated silica are well known.

Gels, on the other hand, are prepared under conditions which promote coalescence of primary particles (typically having median particles sizes of 1 to 10 nm, as measured under by transmission electron microscopy, i.e., TEM) to form a relatively rigid three dimensional network. The coalescence of gel is exhibited on a macroscale when a dispersion of inorganic oxide, e.g., silica, hardens to a "gel" or "gelled" mass having structural integrity.

Methods of preparing inorganic oxide gels are well known in the art. For example, a silica gel is prepared by mixing an aqueous solution of an alkali metal silicate (e.g., sodium silicate) with a strong acid such as nitric or sulfuric acid, the mixing being done under suitable conditions of agitation to form a clear silica sol which sets into a hydrogel, i.e., macrogel, in less than about one-half hour. The resulting gel is then washed. The concentration of inorganic oxide, i.e., $SiO_2$, formed in the hydrogel is usually in the range of about 10 and about 50, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

The newly formed hydrogels are washed simply by immersion in a continuously moving stream of water which leaches out the undesirable salts, leaving about 99.5 weight percent or more pure inorganic oxide behind.

The pH, temperature, and duration of the wash water will influence the physical properties of the silica, such as surface area (SA) and pore volume (PV). Silica gel washed at 65–90° C. at pH's of 8–9 for 15–36 hours will usually have SA's of 250–400 and form aerogels with PV's of 1.4 to 1.7 cc/gm. Silica gel washed at pH's of 3–5 at 50–65° C. for 15–25 hours will have SA's of 700–850 and form aerogels with PV's of 0.6–1.3. These measurements are generated by $N_2$ porosity analysis.

Methods for preparing inorganic oxide gels such as alumina and mixed inorganic oxide gels such as silica/alumina cogels are also well known in the art. Methods for preparing such gels are disclosed in U.S. Pat. No. 4,226,743, the contents of which are incorporated by reference.

In general, alumina gels are prepared by mixing alkali metal aluminates and aluminum sulfate. Cogels are prepared by cogelling two metal oxides so that the gels are composited together. For example, silica alumina cogels can be prepared by gelling an alkali metal silicate with an acid or acid salt, and then adding alkali metal aluminate, aging the mixture and subsequently adding aluminum sulfate. The gel is then washed using conventional techniques.

Another embodiment comprises particles derived from dispersions of certain precipitated inorganic oxides. For example, milling certain precipitated silicas results in dispersions having the porosity properties described later below. Viscosity of certain precipitates as a function of mass fraction is illustrated in FIG. 1.

Reinforced precipitated silica such as that described in U.S. Pat. No. 4,157,920 can also be used to prepare the particles of this invention. The contents of that patent are incorporated herein by reference. For example, reinforced precipitated silicas can be prepared by first acidulating an alkali inorganic silicate to create an initial precipitate. The resulting precipitate is then reinforced or "post conditioned" by additional silicate and acid. The precipitate resulting from the second addition of silicate and acid comprises 10 to 70% by weight of the precipitate initially prepared. It is believed that the reinforced structure of this precipitate is more rigid than conventional precipitates as a result of the second precipitation. It is believed that even after milling, centrifuging and subsequent drying, the reinforced silicate substantially maintains its network rigidity and porosity. This is in contrast to other reported precipitated silicas such as those disclosed in U.S. Pat. No. 5,030,286.

Once an inorganic oxide is selected for the porous particle, it is dispersed in a liquid phase to form a parent dispersion. The medium for the liquid phase can be aqueous or organic. The liquid phase can be residual water in inorganic oxide gels which have been drained, but not yet dried, and to which additional water is added to reslurry the gel. In another embodiment, dried inorganic oxides, e.g., xerogels, are dispersed in liquid medium. In general, the parent dispersion should be in a state that can be wet milled. In most embodiments, the parent dispersion has a median particle size approximately in the range of 10 to 40 microns. However, the size of the parent particles only needs to be sufficient such that the mill being used can produce a dispersion having the desired median particle size at about or below 3 microns. In embodiments prepared from a drained inorganic oxide gel, the drained gel may first be broken up into gel chunks and premilled to produce a dispersion of particles in the range of 10 to 40 microns.

(2) Milling

The parent dispersion is then milled. The milling is conducted "wet", i.e., in liquid media. The general milling conditions can vary depending on the feed material, residence time, impeller speeds, and milling media particle size. Suitable conditions and residence times are described in the Examples. These conditions can be varied to obtain the desired size within the range of 0.05 to about 3 microns. The techniques for selecting and modifying these conditions to obtain the desired dispersions are known to those skilled in the art.

The milling equipment used to mill the parent inorganic oxide particles should be of the type capable of severely milling and reducing materials to particles having sizes about three microns or smaller, particularly below one micron, e.g., through mechanical action. Such mills are commercially available, with hammer and sand mills being particularly suitable for this purpose. Hammer mills impart the necessary mechanical action through high speed metal blades, and sand mills impart the action through rapidly churning media such as zirconia or sand beads. Impact mills can also be used. Both impact mills and hammer mills reduce particle size by impact of the inorganic oxide with metal blades. A dispersion comprising particles of three microns or smaller is then recovered as the final product. This dispersion can then be added to the binder and any additives employed.

The milled dispersion may also be further processed. For example, further processing is desirable if there is need to insure that essentially all of the distribution of particles is below 2 microns, and especially when dispersions in the size range of 1 micron or less is desired, e.g., for glossy paper finishes. In such a case, the milled dispersion is processed to separate the dispersion into a supernatant phase, which comprises the particles to be used, and a settled phase which comprises larger particles. The separation can be created by centrifuging the milled inorganic oxide particles. The supernatant phase is then removed from the settled phase, e.g., by decanting.

Depending on the product particle size targets, the settled phase also can be regarded as the particles to be added to the formulation. For example, if larger particle sizes within the range of 0.05 to 3 microns are used for the formulation, the settled phase can be removed and redispersed as the particles which are added to the formulation.

Conventional centrifuges can be used for this phase separation. A commercially available centrifuge suitable for this invention is identified in the Examples below. In some instances, it may be preferable to centrifuge the supernatant two, three or more times to further remove large particles remaining after the initial centrifuge. It is also contemplated that the larger particles of a milled dispersion can separate over time under normal gravity conditions, and the supernatant can be removed by decanting.

The dispersion of particles also can be modified after milling to insure a stable dispersion. This can be accomplished through pH adjustment, e.g., adding alkaline material, or by the addition of conventional dispersants.

(3) Properties of Inorganic Oxide Particles

As indicated earlier, the median particle size, i.e., particle diameter, of the porous inorganic particles of this invention is in the range of 0.05 to about 3 microns. The size is primarily dictated by the formulation and can be in ranges of, e.g., between 0.06 to 2.9, 0.07 to 2.8, and so on. For example, if the particles are to be used for making a high gloss ink receptive coating, the median particle size will generally be less than one micron, and for some typical applications, the dispersion has a median particle size below 0.5 micron, and preferably in the range of 0.1 and 0.3 micron. The median particle size is measured using conventional light scattering instrumentation and methods. The sizes reported in the Examples were determined by a LA900 laser scattering particle size analyzer from Horiba Instruments, Inc.

In general, the properties of the dispersion can be adjusted depending on the type of coating to be produced from the formulation and the type of binder to which the particles are to be added.

In general, the dispersion's viscosity should be such that the dispersion can be added to the other components of the formulation. The viscosity of the dispersion is highly dependent upon the dispersion's solids content and the porosity of the particles. The solids content of the dispersion is generally in the range of 1–30% by weight, and all ranges in between, although in certain applications, the amount can be higher or lower. A solids content in the range of 10 to 20% by weight is suitable for a number of applications. Viscosity enhancers and agents can also be used to obtain the appropriate viscosity. The viscosity can range from 1 to over 10,000 centiposes (cp) as measured by a Brookfield viscometer, e.g., operated at a shear rate of $73.4 \text{ sec}^{-1}$.

Dispersions of particles prepared from silica gel generally have viscosities similar to the viscosities of the parent silica dispersion. For example, when parent silica gel is milled at a prescribed pH in the range of 8–10, e.g., 9.5, the viscosity of the milled silica remains relatively unchanged. This is distinguishable from viscosities of milled precipitated silicas. The viscosities of milled precipitated silica are less than the viscosity of the parent material.

The pH of the dispersion depends upon the inorganic oxide and additives used to stabilize the dispersion, and can be adjusted to be compatible with the other components in the formulation. The pH can be in the range of 2 to 11, and all ranges in between. For example, dispersions of alumina generally have a pH in the range of 2 to 6. Silica dispersions are generally neutral to moderately alkaline, e.g., 7 to 11. The pH can also be modified using conventional pH modifiers.

With respect to a dispersion of particles comprising silica gel, the dispersion is relatively free of impurities when compared to dispersions comprising, for example, precipitated inorganic oxide particles. Parent silica gels are typically washed to remove substantially all impurities. The alkali salt content of gels are typically as low as 100 ppm by weight and generally no more than 0.1% based on the weight of gel. The low impurity levels of silica gels are especially advantageous when alkali salt would deleteriously affect the performance of the coating or the performance of the other components in the formulation.

The pore volume of the particles can be measured on a dry basis by nitrogen porosimetry after the dispersion is dried. In general, at least about 0.5 cc/g of the particles' pore volume is from pores having a pore size of 600 Å or less. There are embodiments comprising silica gel in which at least 0.7 cc/g and at least 0.9 cc/g of pore volume is from pores having sizes less than 600 Å. In those embodiments, up to about 100% of the pores have diameters less than 600 Å, and at least about 80% of the pores in silica gels have diameters of 300 Å or less. The total pore volume of the particles as measured on a dried basis is in the range of about 0.5 to about 2.0 cc/g, with embodiments comprising silica gel having total pore volume measurements in the range of about 0.5 to about 1.5, and for certain silica gel embodiments in the range of 0.7 to about 1.2 cc/g. Measuring the pore size distribution and pore volume on a dry basis requires adjusting the pH of the dispersion of particles to about 6, slowly drying the dispersion at 105° C. for sixteen hours, activating the dried dispersion at 350° C. under vacuum for two hours, and then using standard BJH nitrogen porosimetry.

The porosity of the particles can also be defined by the viscosity of the dispersion system in which the particles are added. Compared to less porous particles (at the same mass loading in a solvent), porous particles occupy a greater volume fraction of the solvent-particle system and, as such, they to a greater extent disrupt and offer greater resistance to shear flow of the fluid. FIG. 1 shows that as loadings of particles increases, viscosity ($\eta$) increases in such a manner that a linear relationship is obtained when $$\frac{\eta_0}{\eta}$$

is plotted against a certain range of particle loadings. $\eta_0$ is the viscosity of the dispersion's solvent, i.e., water. As shown in FIG. 1, slope for the curve shown increases as the porosity of particles increases. A "viscosity derived pore volume" for the particles thus can be calculated from the slope of these curves. These values reflect pore volumes for the particles.

For example, the effect of loading small particles on the viscosity of a dispersion of those particles in a Newtonian fluid is described by I. M. Krieger in *Adv-Coll. Interface Sci.*, 1972, 3, 111. The formula defines the reciprocal of $$\frac{\eta_0}{\eta}$$

with the following formula (1).

$$\frac{\eta}{\eta_0} = \left[1 - \frac{\Phi}{b}\right]^{-ab} \quad (1)$$

wherein $\eta$ is the dispersion's viscosity $\eta_0$ is the viscosity of the fluid in which the particles are dispersed $\Phi$ is the volume fraction of the suspension occupied by the particles a is the "intrinsic viscosity" (equal to 2.5 for spherical, or very low aspect ratio uncharged particles)

b is the volume fraction at which the viscosity becomes infinite.

A relationship (2) also exists between $\Phi$ and the mass loading (x) of particles in the suspension expressed as a mass fraction solids, and the particles skeletal density ($\rho s$) and its apparent pore volume (PVa), referred to herein as the "viscosity derived pore volume".

$$\Phi = \frac{\left(\frac{1}{\rho s} + PVa\right)\rho f x}{1 - x\left(1 - \frac{\rho f}{\rho s}\right)} \quad (2)$$

where $\rho f$ is the density of the fluid phase.

Coupling of equations (1) and (2) yields a relationship relating $$\frac{\eta_0}{\eta}$$

to the mass loading of particles. For relatively small values of x this relationship can be illustrated by the following linear expression which is independent of the parameter b.

$$\frac{\eta_0}{\eta} = 1 - a(\rho f)\left(\frac{1}{\rho s} + PVa\right)x \quad (3)$$

This linear relationship generally holds for values of $$\frac{\eta_0}{\eta}$$

from 0.5 to 1.0. Viscosity data for a system of well dispersed particles can then be plotted in the form of $$\frac{\eta_0}{\eta}(x)$$

and linear regression applied to the $$\frac{\eta_0}{\eta}$$

data of 0.5 to 1.0 to determine the slope. From equation (3), it is apparent that this slope can be related to the PVa of the particles by the following equations.

$$\text{slope} = -a(\rho f)\left(\frac{1}{\rho s} + PVa\right) \quad (4)$$

$$PVa = -\left(\frac{\text{slope}}{a(\rho f)} + \frac{1}{\rho fs}\right) \quad (5)$$

Knowing the skeletal density of amorphous silica (2.1 g/cc), the density of the fluid phase (water=1.0 g/cc) and knowing that the intrinsic viscosity, a, is equal to approximately 2.5, PVa for the invention is calculated. This curve is illustrated in FIG. 1 for several embodiments of the invention, as well as a relatively non-porous colloid.

The viscosity derived pore volume values for dispersions, especially dispersions of silica particles, are, in general, determined according to the following methodology.

(1) A dispersion of selected inorganic oxide is milled at one liter per minute and centrifuged for thirty minutes at 600 G or at 2,000 G.

(2) The pH of the dispersion is then adjusted so that a dispersion is obtained and maintained. Typically this is obtained by adjusting the pH of the dispersion away from the isoelectric point of the particles, but not into pH regimes that would cause excessive dissolution of the particles (e.g., for silica adjust the pH to between 9.7 and 10.3 by adding NaOH). In general, this pH range of optimum dispersion can be determined by titration of a 5wt. % solids dispersion through the entire region of acceptably low particle solubility and determining the pH range associated with minimum dispersion viscosity. The milled dispersion from (1) is then adjusted to a pH in that range.

(3) The viscosity ($\eta$) of the dispersion is measured and the viscosity of the dispersion's medium ($\eta_0$), e.g., water, is determined. These viscosities are measured using a Brookfield viscometer at 74 sec$^{-1}$ at 25.0±0.1° C.

(4) The ratio of $$\frac{\eta}{\eta_0}$$

is then determined to obtain $$\frac{\eta_0}{\eta}(x)$$

values uniformly dispersed through the range of $$\frac{\eta_0}{\eta}$$

values between 0.5 and 1.0. This is accomplished by first estimating the slope of $$\frac{\eta_0}{\eta}(x)$$

using a reference sample and then using that estimated slope to determine the concentration of dispersions to be prepared to give the desired range of $$\frac{\eta_0}{\eta}$$

determinations. If $$\frac{\eta_0}{\eta}$$

of the dispersion from (2) is greater than 0.5 and less than 0.9 it can be used as the reference sample to calculate the estimated slope, ESL, for the $$\frac{\eta_0}{\eta}(x)$$

plot. If $$\frac{\eta_0}{\eta}$$

is less than 0.5, the slurry sample must be diluted with solvent (typically DI water) then reevaluated for $$\frac{\eta_0}{\eta}.$$

If $$\frac{\eta_0}{\eta}$$

is greater than 0.9, a more concentrated dispersion sample must be obtained.

Once a reference sample with $$\frac{\eta_0}{\eta}$$

between 0.5 and 0.9 is obtained, the mass loading x is determined using conventional techniques and ESL is calculated from the following equation.

$$ESL = \frac{\left(\frac{\eta_0}{\eta}\right)ref - 1}{xref}$$

(5) Concentrations (x values) for a series of samples for the PVa determination are then calculated using the following formulae.

$$\text{target} = \frac{\eta_0}{\eta}$$

| | |
|---|---|
| .9 | $x = \frac{.9 - 1}{\text{ESL}}$ |
| .8 | $x = \frac{.8 - 1}{\text{ESL}}$ |
| .7 | $x = \frac{.7 - 1}{\text{ESL}}$ |
| .6 | $x = \frac{.6 - 1}{\text{ESL}}$ |
| .5 | $x = \frac{.5 - 1}{\text{ESL}}$ |

(6) Dispersions with these mass loadings are then prepared within the appropriate pH range determined in (2).

(7) The viscosity of each of these samples is determined by Brookfield viscometer at a shear rate of 73.4 sec.$^{-1}$ after equilibration at 25.0±1° C./ These data are then plotted.

(8) Regression analysis is applied to obtain the slope of the data generated and the slope, ρs, and ρf are input into the formula $$\text{slope} = -2.5\left(\frac{1}{\rho s} + PVa\right)\rho f$$

to calculate (PVa).

Silica dispersions of particles used in this invention show curves having an absolute slope of about 2.40 or greater, and generally in the range of 2.4 to 10.0. This data generally translates into dispersions having viscosity derived pore volumes (PVa's) of at least about 0.5 cc/g. Preferred embodiments of the formulation are prepared from particles which show a slope in the range of 3.50–5.0 and have a PVa of about 1.0 to about 1.5 cc/g.

The stability of the porosity in the particles of this invention is evidenced by calculating the loss in pore volume after a dispersion of the particles is dried. Comparing the particles' PVa and the pore volume measured after the dispersion is dried shows that at least 40% of the PVa is maintained for particles of this invention. Certain embodiments show that at least about 60% of the PVa pore volume is maintained. See FIG. 3 and Example VII. Moreover, embodiments maintaining only 40% of PVa have a dried pore volume of about 0.5 cc/g or greater.

The inorganic oxide particles can also be surface modified separately to enhance their performance in the formulation, and in particular enhance their performance in an ink, receptive coating. These modifications are discussed later below.

The binder used to prepare the formulation comprises a polymer capable of binding pigment particles. Film forming polymers in general are suitable. Particularly suitable polymers are those conventionally used to make formulations for ink receptive coatings and include any one or more combinations of polyvinyl alcohol derivatives such as completely saponified polyvinyl alcohol, partially saponified polyvinyl alcohol, silanol group modified vinyl alcohol copolymer; cellulose derivatives such as carboxymethyl cellulose, hydroxyethyl cellulose, hydroxypropyl methyl cellulose, water soluble polymers such as polyvinyl pyrolidone, starch oxide, modified starch, gelatin, casein, or acrylic acid type polymers. Further, binders such as vinyl acetate and ethylene-vinyl acetate emulsions, styrene butadiene latexes, or acrylic type emulsions can also be used depending on the application.

When the formulation is used as an ink receptive coating, polyvinyl alcohol type polymers such as completely saponified polyvinyl alcohol, partially saponified polyvinyl alcohol, or silanol group modified vinyl alcohol copolymer are preferable with respect to ink, absorbability and the strength of the coating.

The formulation optionally comprises additives, depending on how the formulation is being used. In embodiments which are being used to prepare ink receptive coatings, dye mordant additives can be included to fix dyes as they are applied to the coatings. For that purpose, there may be incorporated in the coating formulation at least one component selected from the group consisting of amine-containing polymers such as polyethylene imine or polyaryl amines; ionic water soluble polymers such as the salts of amine polymers, including poly(diamines) or amine-containing acrylate copolymers or poly(diallyl dimethyl ammonium chlorides); and water soluble metal salts thereof.

Optional additives also include colorants, thickeners, release agents, flow modifiers, as well as conventional pigments such as clays, fumed silicas, precipitated silica and the like. Further, a fluorescent brightening agent, a surfactant, a fungicide, crosslinkers or a dispersant can be included in the formulation as required.

The amount of pigment to binder in the formulation varies depending on the formulations used. For applications such as ink receptive coating formulations, the weight ratio of pigment to binder in the formulation is 1:100 to 100:1. The ratio depends on the application. If it is desired to prepare an ink receptive coating formulation in which PVC is less than CPVC, the pigment/binder ratio is typically about 1:1 to about 1:50. If a PVC greater than CPVC is desired, the pigment/binder ratio is typically about 1:1 to about 4:1.

Additives typically comprise a smaller percentage of the total composition and generally are added in 1 to 30% by weight of the total formulation.

The ingredients to the formulation are combined using conventional techniques and mixers. The pigment is preferably added as a dispersion, usually comprising about 1–30%, by weight solids, and added in amounts to obtain the desired pigment to binder ratio. The order of addition depends on the compatibility of the components. If necessary, certain ingredients can be precombined with another ingredient before all of the ingredients are finally combined together.

The formulation is especially adaptable for preparing ink receptive coatings and can be applied to substrates used for that purpose. Such substrates include pulp-based substrates including chemical pulps such as hardwood bleached kraft pulp, softwood bleached kraft pulp, high yield pulps such as groundwood pulp or thermo-mechanical pulp, recycled pulps and non-wood pulps such as cotton pulp can be used. It is possible to mix synthetic fiber, glass fiber or the like in the pulp depending on the application.

The substrate can also be films of vinyl, polyester, polystyrene, polyvinyl chloride, polymethyl methacrylate, cellulose acetate, polyethylene and polycarbonate. The substrates for ink receptive medium generally are 10–300 microns in thickness.

The formulation is applied to the substrate using conventional techniques, including using conventional coaters such as a blade coater, air knife coater, roll coater, brush coater, curtain coater, bar coater, gravure coater, and spray gun. The recording sheet carrying a freshly applied ink receptive layer can be used as such in the ink jet recording, or after having been improved in surface smoothness by passing through the roll nip of a super calender, gloss calender, or the like under application of heat and pressure. The formulation is applied at an amount in the range of 2 to 50 g/m² and preferably 5 to 30 g/m². The amount of formulation applied should be at least enough to provide acceptable printability and image quality. For ink receptive layers, the formulation generally is applied to a thickness of 1–100 microns.

As mentioned above, the formulation is especially suitable for preparing ink receptive coatings, or ink jet paper for which relatively high gloss finishes are desired. In contrast to non-porous prior art colloidal silica, the volume of the same mass of porous silica provides an additional source volume, i.e., internal pore volume. This is reflected by $V_{porous\ silica}=m*(1/\rho+PV)$ where PV is the pore volume of the dried silica, or void space associated with the network of pores internal to the silica particles, and where $\rho$ is the silica skeletal density, i.e., 2.1 g/cc. PV is measured by nitrogen BJH porosimetry. The volume of a given mass, m, of non-porous colloidal silica is given by $V_{colloid}=m/\rho$.

This internal pore volume is especially advantageous for ink receptive coatings. In the ink-receptive coating application of this invention, the porous inorganic oxide pigment is formulated with binders that, for the most part, do not absorb into internal void spaces, thereby making pore volume available for absorption of ink-fluids. By contrast, colloidal silica does not contain this internal void space, and coatings comprising colloid become saturated with low levels of ink-liquids. With all other factors being equal, a coating formulated with porous inorganic oxides has an additional capacity for ink fluid absorption relative to coatings formulated with prior art colloidal particles, the additional capacity being directly related to pore volume. In a similar fashion, ink-drytimes for coatings formulated with porous pigments are usually shorter than those coatings formulated with colloidal silica.

Unlike formulations comprising typical pigments, the inorganic oxide pigment of the formulation also has porosity that is stable. The examples below illustrate that the porosity of the particles of this invention is maintained after drying. Silica gel particles show further stability as evidenced by the maintenance of porosity when the particles are formed by milling. See Examples VI and VII. Therefore, from formulation to formulation, the invention consistently contributes properties such as fast ink dry times, minimal dot gain (spreading), good image resolution, high ink loads and exceptional color gamut.

Even further, the use of this formulation results in high quality ink-receptive coatings that exhibit higher gloss than coatings prepared using larger size prior art pigments that are formulated above the CPVC. Those prior art pigments are used primarily for ink receptivity and typically do not exhibit very high gloss because the surface of the coating has a degree of roughness associated with it. For coatings formulated using prior pigments above the CPVC, the surface roughness is related to the particle size of the "continuous" or close-packed pigment phase. In comparison to coatings formulated with relatively large particles of porous silica, glossy coatings can still be maintained with the small, porous inorganic oxide particles of this invention because they do not create the same degree of surface roughness.

This invention also provides acceptable ink receptivity and relatively glossy coatings at low PVC, specifically for coatings having a PVC less than CPVC. The advantage of the fine porous particles of this invention compared to colloidal silicas in this circumstance is that they increase the capacity of the coating to absorb liquid. The increased capacity to absorb ink liquids is directly related to the intrinsic porosity internal to each porous particle.

As mentioned earlier, the surface of the fine particles can be modified to enhance their performance, especially in ink receptive coatings. The fine inorganic particles of the dispersions can be modified to create particles exhibiting positive surface charge (zeta potential). The surface charge should have a zeta potential of at least +20 mV, and preferably at least +40 mV.

Ink receptive coating formulations typically have a pH in the range of 2 to 8. Dispersions comprising particles having a positive surface charge are more stable towards irreversible agglomeration in that pH range than are the unmodified dispersions, especially if silica is used for to prepare particles and the silica particles exhibit a negative zeta potential. Ink-receptive coatings prepared from these formulations also show better image-forming characteristics. To create the positive surface charge on the particles, the particles can be modified by additives having a cationic moiety and can be modified, for example, with alumina, organic cation-containing silanes, e.g., amine-containing silanes, and ionic polymers, e.g., quaternary ammonium compounds such as diallyl dimethyl ammonium chloride polymer. The particles can be modified by introducing the modifying additive when the parent inorganic oxide is dispersed, e.g., co-milling alumina or cationic polymer with a parent silica dispersion. The particles can also be modified by reacting the particles with additive after the particles are made, e.g., conducting a silanization reaction with amino silanes. The examples below show that irreversible agglomeration of the particles in the dispersion is reduced or eliminated when modifying the particles as described above.

The following examples of the invention are illustrative and are not intended to limit in any way the invention as recited in the appended claims.

ILLUSTRATIVE EXAMPLES

Preparation of Inorganic Oxide Particles

Example I

Silica Gel Particles Derived from Hydrogel Parent

Well drained hydrogel[1] was presized by a Prater mill to a median particle size of approximately 30 $\mu$. The powder was then slurried in deionized water (DI) yielding a slurry of about 20% by weight solids and pH of about 8. This slurry was fed to a five (5) liter Drais media mill (model PM5RLH, 1.5 mm, glass media) at a rate of one liter per minute resulting in a viscous slurry.

Separation of the coarse and fine (submicron) fractions of the milled silica gel product was accomplished by a two step centrifugation process (90 min. at 1400 G's, decant, then 40 min. at 2,000 G's). The final submicron particle suspension was obtained by simply decanting. The solids content of the supernatant dispersion was 13 wt. % and yield was determined to be 41% (on a dry $SiO_2$ basis).

[1] Hydrogel prepared at about 1.5 pH to produce 19% by weight silica and washed with dilute NH₄OH.

| Particle Size Distribution (Horiba 900)[2] | |
| --- | --- |
| 10%< | .13μ |
| 50%< | .22μ |
| 90%< | .38μ |
| 99.9%< | .77μ |

[2] Determination of particle size distribution required separation of coarse and fine fractions by centrifugation, particle size measurement of each fraction by Horiba Instruments 900 brand particle size analyzer, and then constructing the composited distribution by weight summation.

Example II

Silica Gel Particles Derived from Hydrous Gel Parent

Another submicron silica gel product was made using the same process as described in Example I except that the parent gel was presized in an air classification mill yielding a median silica gel particle of approximately 15 μ The gel is partially dried during this process with its moisture content (measured as total volatiles) dropping from about 67% to 55% by weight thus forming a hydrous gel material.

After media milling and centrifugation as described in Example I (except at 27% solids vs. 20% in Ex. I), a supernatant comprising a dispersion of 12 wt. % solids at a yield of 10% was obtained. The supernatant had the following particle size distribution:

| Particle Size Distribution (Horiba 900) | |
| --- | --- |
| 10%< | .13μ |
| 50%< | .18μ |
| 90%< | .30μ |
| 99.9< | .55μ |

Example III

Silica Gel Particles Derived from Aerogel Parent

Wet-milled Genesis™ gel was slurried to approximately 20% solids by weight in deionized water and the pH was adjusted to about 8. The slurry was then wet milled using a Netzsch LMZ-11 mill (with 0.6–0.8 mm SEPR media) at 3.8 liters per minute. The milled slurry was then diluted to 14.9% solids with DI water using a Myers mixer.

Separation of the coarse and fine fractions of the milled gel was accomplished by a two step centrifugation process, i.e., 90 minutes at 1,050 G's, decant, then another spin at the same conditions.

The total solids was 8.8% and the particle size distribution was:

| Particle Size Distribution (Horiba 900) | |
| --- | --- |
| 10%< | .086μ |
| 50%< | .121μ |
| 99%< | .181μ |
| 99.9%< | .322μ |

Example IV

Silica Gel Particles Derived from Xerogel Parent

Syloid® 74×6500 silica xerogel was slurried in D.I. water to produce a 24% by weight solids dispersion, and NH₄OH was added to adjust the pH to about 8.

This slurry was then wet-milled using a Netzsch LMZ-05 mill (with 0.4 to 0.6 mm SEPR media) and a recirculation rate of 0.75 L/min. The total batch was passed through the mill six times. The pH after milling was 8.20. The final particle size of the milled slurry was:

| Particle Size Distribution (Horiba 900) | |
| --- | --- |
| 10%< | 0.72μ |
| 50%< | 1.30μ |
| 99.9%< | 4.59μ |

Example V

Viscosity Derived Pore Volumes (PVa) and Dried Dispersion Pore Volumes of Assorted Inorganic Oxide Particles Sample 1—Hydrous Gel A hydrous gel having fifty-five (55) weight % total volatiles was slurried to 19% by weight solids. The pH was adjusted to 9.6 with NaOH. The dispersion was milled in a four liter Drais mill (1.5 mm glass beads) at a rate of 1 liter (L)/minute using six passes.

The resulting slurry was then centrifuged for thirty minutes at 600 G, 2000 G, or 27,000 G. Viscosity derived pore volumes (PVa), dried pore volumes (N₂ BJH porosimetry), as well as particle size distribution and BET surface areas (nitrogen porosimetry) were measured for the parent dispersion, milled dispersion and each of the centrifuged dispersions. The results are reported in Table 1 below.

Sample 2—Precipitated Silica

A dispersion of 11.4% solids was prepared using FK310 precipitated silica from Degussa. The pH of the dispersion was adjusted to 9.3 and then milled, centrifuged, measured and tested in the same manner as Sample 1. The results are reported in Table 1.

Sample 3—Silica Gel

A dispersion of 21.4% solids was prepared using Syloid® 63 silica gel from Grace Davison of W. R. Grace & Co.-Conn. The pH of the dispersion was adjusted to 9.8.

The dispersion was then milled (except for 8 passes instead of 6), centrifuged, measured and tested in the same manner as Sample 1. The results are reported in Table 1.

Sample 4—Precipitated Silica

A dispersion of 8.4% solids was prepared using Zeothix™ 177 precipitated silica from Huber. The dispersion was then milled (using Netzsch mill), centrifuged (except only at 2000 G's for thirty minutes), measured and tested in the same manner as Sample 1. The results are reported in Table 1.

Sample 5—Aerogel

A dispersion of 18.2% solids was prepared from Genesis™ gel from Grace Davison. The pH of the dispersion was adjusted to 9.8. The dispersion was milled in a Reitz mill (0.016 screen) for three passes and then milled eight more times in a Drais mill. Both mills were fed with inorganic oxide at one liter/minute. The milled dispersion was then centrifuged, measured and tested in the same manner as described in Sample 1. The results are reported in Table 1.

Sample 6—Colloidal Silica

A sample of Nalco 1140 colloidal silica available from Nalco was measured and tested in the same manner as described for Sample 1. The median particle size of 0.015 micron is taken from literature available in the art. The results are reported in Table 1.

TABLE 1

| | % (Weight) | | Particle Size (Honba 900), μ | | | | Viscosity @ (1) 10% Solids, 25° C. (cp) | Viscosity Derived (2) Pore Volume (PVa) (cc/g) | N2 Porosimetry on Neutralized/Dried | | |
|---|---|---|---|---|---|---|---|---|---|---|---|
| | Solids | pH | 10% | 50% | 90% | 99.90% | | | SA | PV @ 967 P/Po | PV @ 995 P/Po |
| Sample 1 Hydrous Gel | | | | | | | | | | | |
| Parent Slurry | 18.5 | 9.6 | 4.4 | 8.8 | 15.8 | 32.1 | 1.82 | 1.31 | 265 | 1.163 | 1.179 |
| Drais Milled | 19 | 9.6 | 36 | 60 | 1.6 | 4.2 | 1.82 | 1.33 | 215 | 0.932 | 0.936 |
| Milled & Centr 30 mins @ | | | | | | | | | | | |
| 600 g | 17.2 | 9.4 | 29 | 44 | 84 | 2.7 | 1.83 | 1.33 | 230 | 0.962 | 0.962 |
| 2000 g | 15.8 | 9.2 | 23 | 38 | 71 | 2.3 | 1.95 | 1.47 | 236 | 1.051 | 1.054 |
| 27000 g | 10.1 | 9.3 | .08 | 11 | 15 | 24 | 1.93 | 1.45 | 252 | 0.859 | 0.868 |
| Sample 2 FK-310 Precipitate | | | | | | | | | | | |
| Parent Slurry | 11.4 | 9.3 | 3.4 | 6.6 | 11.3 | 21.6 | 2.41 | 1.86 | 330 | 1.141 | 1.423 |
| Drais Milled | 11.9 | 9.5 | 37 | 68 | 1.9 | 5.4 | 1.81 | 1.31 | 233 | 0.878 | 1.113 |
| Milled & Centr 30 mins @ | | | | | | | | | | | |
| 600 g | 7.5 | 9.8 | 20 | 33 | 55 | 1.6 | 1.88 | 1.40 | 288 | 1.122 | 1.254 |
| 2000 g | 4.8 | 9.5 | 12 | 20 | 36 | 78 | 1.80 | 1.30 | 268 | 1.070 | 1.072 |
| 27000 g | 0.4 | 9.5 | — | — | — | — | | | | | |
| Sample 3 Syloid ® 63 Silica | | | | | | | | | | | |
| Parent Slurry | 21.4 | 9.8 | 2.5 | 7.5 | 16.3 | 35.7 | 1.31 | 48 | 326 | 366 | 368 |
| Milled (Drais) | 21.5 | 9.8 | 26 | 66 | 1.7 | 4.5 | 1.41 | 68 | 212 | 298 | 386 |
| Centr 600 g | 13.6 | 9.9 | 24 | 37 | 55 | 1.2 | 1.43 | 72 | 212 | 423 | 572 |
| 2000 | 6 | 9.9 | 11 | 16 | 24 | 45 | | | 185 | 666 | 716 |
| 27000 | 0.5 | | — | — | — | — | | | | | |
| Sample 4 Zeothix 177 Precipitate | | | | | | | | | | | |
| Parent Slurry | 8.4 | 9.9 | 1.5 | 3.7 | 7.1 | 15.6 | 10.5 | 3.14 | 109 | 408 | 598 |
| Milled (Netzsch) | 15.7 | 9.7 | 29 | 59 | 4.2 | | 1.83 | 1.33 | 130 | 696 | 855 |
| Center (2000 g) | 14.6 | 9.6 | 0.14 | 26 | 50 | 1.8 | 1.83 | 1.33 | 145 | 827 | 956 |
| Sample 5 Genesis Gel | | | | | | | | | | | |
| Parent Slurry (Reitz Milled) | 18.2 | 9.8 | 6.7 | 29.4 | 70.3 | 143.3 | 2.25 | 1.75 | 267 | 1.140 | 1.155 |
| Drais Milled | 18.5 | 9.8 | 0.35 | 0.65 | 2.4 | 32.8 | 2.25 | 1.75 | 246 | 0.968 | 0.972 |
| Milled & Centr 30 mins @ | | | | | | | | | | | |
| 600 g | 17.5 | 9.8 | 0.28 | 0.48 | 1.7 | 6.1 | 2.25 | 1.75 | 266 | 1.062 | 1.073 |
| 2000 g | 16.6 | 9.8 | 0.20 | 0.42 | 1.3 | 4.0 | 2.25 | 1.75 | 263 | 0.998 | 1.003 |
| 27000 g | 13.2 | 9.8 | 0.09 | 0.14 | 0.26 | 0.78 | — | — | 265 | 0.979 | 0.985 |
| Sample 6 Colloidal Silica | | | | | | | | | | | |
| Nalco 1140 | 40.8 | 9.9 | (015) | | | | 1.28 | 40 | 155 | 403 | 405 |

(1) Interpolated from regression analysis (FIG. 1)
(2) Calculated from viscosity data FIG. 1 reflects the viscosity and mass fraction solids data plotted to determine the PVa for dispersions described in Samples 1, 2, 3, 4 and 6. This Figure confirms PVa measurements calculated using the methodology described earlier. Viscosity and loadings data for the dispersion of Sample 1 centrifuged at 600 G is reflected by (●) in FIG. 1. The same data for the dispersions of Samples 2 and 3 centrifuged at 600 G is reflected by (□), and (○), respectively. The data for the dispersion of Sample 4 was from the dispersion centrifuged at 2000 G and is reflected by (Δ) in FIG. 1. The data for Sample 6, as is, is reflected by (■) in FIG. 1.

The slopes of the curves in FIG. 1 were calculated using regression analysis and inserted in formula (3) illustrated earlier along with the additional data below to determine PVa's.

$\eta$, $\eta_o$ was determined using a Brookfield LVTD viscometer using a jacketed low viscosity cell controlled at 25.0 to 0.1° C., at a shear rate of 73.4/sec.

$\alpha$2.5 assumed for spherical particles $\rho f$ 1.0 g/cc for water $\rho s$ skeletal density of inorganic oxide, e.g., 2.1 g/cc, for silica

Example VI

Viscosity Derived Pore Volume of Silica Particles

Sample 1

A Brookfield viscometer at 73.4 sec$^{-1}$, viscosity (cps) was used to measure the parent dispersion, the Drais milled dispersion and centrifuged (600 G) dispersion of Sample 1 (hydrous gel) of Example V and plotted as (η) in $$\frac{\eta_0}{\eta}$$

versus mass fraction solids wherein $\eta_0$ is the viscosity of water. The data for the parent (○), milled dispersion (□), and centrifuged (△) dispersions is illustrated in FIG. 2A. The median particle size and PVa for each were 8.8μ and 1.34, 0.60μ and 1.33, and 0.44μ and 1.33, respectively.

Sample 2

Viscosity (cps) was measured (using Brookfield at 73.4 sec$^{-1}$) for the parent dispersion, milled dispersion and centrifuged (2000 G) dispersion of Sample 4 (Zeothix™) in Example V and plotted as (η) in $$\frac{\eta_0}{\eta}$$

versus mass fraction solids wherein $\eta_0$ is the viscosity of water. The data for the parent (○), milled dispersion (□), and centrifuged (△) dispersions is illustrated in FIG. 2B. The median particle size and PVa for each were 3.7μ and 3.14, 0.59μ and 1.33, and 0.26μ and 1.33, respectively.

Sample 3

Viscosity (cps) was measured (using a Brookfield viscometer at 73.4 sec$^{-1}$) for the parent dispersion, milled dispersion and centrifuged dispersion (600 G) and plotted as (η) in $$\frac{\eta_0}{\eta}$$

versus mass fraction solids wherein $\eta_0$ is the viscosity of water. The data for the parent (○), milled dispersion (□), and centrifuged (△) dispersions is illustrated in FIG. 2C. The median particle size and PVa for each were 6.6μ and 1.86, 0.68μ and 1.31, and 0.33μ and 1.40, respectively.

FIG. 2A illustrates that the parent, milled and centrifuged dispersions of silica gel have about the same viscosity, and accordingly similar PVa's. This indicates that pore volume was not measurably lost when the parent silica gel dispersion was milled. FIGS. 2B and 2C show that precipitated silicas of this invention have a reduced viscosity compared to their parent at comparable loadings after milling. This is believed to be caused by destruction of pore volume.

Example VII

Maintenance of Pore Volume Upon Drying

The N$_2$ BJH pore volume measured for the dispersions made in Example VI were compared and plotted against the PVa measured for those dispersions. This comparison is illustrated in FIG. 3. The dispersions were pH adjusted to 6, dried at 105° C. for about 16 hours, activated at 350° C. for two hours and then measured using BJH nitrogen porosimetry.

The dashed (-) line is a line of comparison where the BJH pore volume equals PVa. This line reflects no loss of porosity upon drying. The other data reflected in FIG. 3 is identified in the following legend.

● ID (Sample 1)
○ Degussa (Sample 2)
△ Huber Zeothix 177 (Sample 4)
□ Syloid 63 (Sample 3)
■ Nalco 1140 (Sample 6)
B=Parent slurry unmilled
M=Milled slurry not centrifuged
6=Colloidal supernatant after centrifuged at 600 G
20=After centrifuged at 2000 G The upper point of data is pore volume calculated @.985 P/Po and the lower point is pore volume calculated at 0.967 P/Po.

The data for Syloid 63 silica gel (□) reflects that the inventive dispersions maintain at least 40% of PVa after drying. Other silica dispersions, e.g., ID gel (●), maintains at least 60% of PVa. This data and data showing that at least 0.5 cc/g of porosity is from pores having sizes below 600 Å indicates that the porosity is internal porosity which is less subject to the factors that affect prior art dispersions.

Example VIII

Glossy Paper Coatings—Preparation of Coatings with Improved Gloss Compared to Prior Art Silica Gels Starting Materials:

(a) A dispersion of sub-micron silica particles was produced by a process similar to that described in Example I. The total solids of this slurry was 16.0% by weight. The particle size of this sample was:

| Horiba Particle Size | |
|---|---|
| $D_{10},\mu$ | 0.193 |
| $D_{50},\mu$ | 0.339 |
| $D_{90},\mu$ | 0.584 |
| $D_{99.9},\mu$ | 1.670 |

(b) A dispersion of SYLOID® W300 silica gel (Grace Davison), total solids of 45% by weight, was used for comparison. This product has an average particle size ($D_{50}$) of about 8μ.

(c) A latex (Vinac XX210, non-ionic polyvinylacetate latex, available from Air Products) was used as the binder.

(d) The substrate was a conventional gloss white film.

Procedure: Coating formulations were prepared at constant solids content and silica/binder ratio, so that the effect of silica particle size on film gloss could be determined. The silicas were mixed into the latex, and this formulation was coated onto the white film using a K Control Coater and a #6 rod. The wet coatings were dried using a heat gun, and then were heated in an oven at 80° C. for 5 minutes. Gloss measurements were made using a Byk-Garner Gloss Meter on the coated sheets at 20°, 60° and 85° from normal. High values correspond to high gloss. Results are given in table below.

It can be seen that use of the sub-micron silica resulted in coatings with gloss higher than for those with W300 silica which has a median particle size of 8 μ

| Sample Number | Silica | Coating Solids | Silica/binder (by weight) | Gloss 20° | Gloss 60° | Gloss 85° |
|---|---|---|---|---|---|---|
| 1 | submicron silica | 37 | 0.28 | 1.3 | 8.1 | 32.7 |
| 2 | submicron silica | 32 | 0.46 | 1.4 | 10.3 | 62.0 |
| 3 | W300 | 37 | 0.28 | 1.2 | 4.1 | 6.0 |
| 4 | W300 | 32 | 0.47 | 1.2 | 3.0 | 4.2 |

Example IX

Improved Ink Drytime Over Non-Porous Colloidal Silica

Starting Materials:

(a) A dispersion of sub-micron silica particles was produced by a process by wet-milling W500 silica at 18.6% total solids using the Netzsch LMZ-11 media mill charged with 0.6–0.8 mm media. The pH of this suspension was 8.6, and the particle size of this sample was:

| Horiba Particle Size | |
|---|---|
| $D_{10}, \mu$ | 0.318 |
| $D_{50}, \mu$ | 0.512 |
| $D_{99.9}, \mu$ | 3.18 |

(b) The milled slurry was then centrifuged at 1060 G for 30 min. The recovered supernatant had a solids content of 17.4%, and the particle size was:

| Horiba Particle Size | |
|---|---|
| $D_{10}, \mu$ | 0.254 |
| $D_{50}, \mu$ | 0.403 |
| $D_{99.9}, \mu$ | 2.334 |

(c) A sample of Nalco 1140 from Example V (Sample 6) was used as the non-porous silica.

Procedure:

Coating formulations were prepared at constant solids and constant silica/binder ratio, so that the effect of silica porosity on ink dry-time could be measured. The formulation used for comparison was 100 parts silica, 30 parts poly(vinylalcohol) [Air Products Airvol 823] and 15 parts poly(diallyl dimethyl ammonium chloride) dye mordant [Calgon CP261L V]. Silica dispersions having 17.4% solids were prepared, and then charged to a mixer, and the pH was lowered with the addition of 1.0 M HCl to 2.8–3.3. The Airvol 823 was then added, and the silica/PVOH mixture was stirred for 1–2 min. Finally, the CP261LV mordant, after dilution with water, was added dropwise with vigorous stirring. The final pH was adjusted to between 2.8 and 3.5.

The formulation was coated onto a film substrate (ICI Melinix #454) using a K Control Coater and a #8 rod. The wet coatings were dried using a heat gun, and then were heated in an oven at 80° C. for 5 min. Visual examination of the films demonstrated that they were free from large-scale defects.

In order to measure ink-drytime, a Hewlett-Packard 550° C. printer was used to print a black strip of ink down the length of the coated film. After intervals of ~1 min., a strip of paper was laid over the printed area and pressed with a roller of fixed mass. The amount of ink transferred from the film to the paper was then observed visually. The time at which there was essentially no ink-transfer is given below for each of samples (a)–(c):

| | |
|---|---|
| Sample (a)- milled W500: | 2 min. < t < 4 min. |
| Sample (b)- milled, centrifuged W500: | 2 min. < t < 4 min. |
| Sample (c)- Nalco (nonporous) silica: | 4 min. < t < 6 min. |

Thus, the film was dry between 2 and 4 minutes for the porous silica coatings, but took longer to dry for the non-porous silica coating.

Example X

Improved Ink Drytime Over Non-Porous Colloidal Silica

Starting Materials:

The same silicas used in Example IX were used in this Example.

Procedure:

Coating formulations were prepared at constant solids and constant silica/binder ratio, so that the effect of silica porosity on ink dry-time could be measured. The formulation used for comparison was 69 parts silica, 21 parts poly(vinylalcohol) [Air Products Airvol 325] and 10 parts poly(ethyleneimine) dye mordant [BASF Lupasol G35]. The silica dispersions of 17.4% solids were prepared for each sample and then charged to a mixer, and the pH was lowered with the addition of 1.0 M HCl to 2.8–3.3. The Airvol 325 was then added, and the silica/PVOH mixture was stirred for 1–2 min. Finally, the Lupasol G35 mordant, after dilution with water, was added dropwise with vigorous stirring. The final pH was adjusted to between 2.8 and 3.5.

The formulation was coated onto a film substrate (ICI Melinix #454) using a K Control Coater and a #8 rod. The wet coatings were dried using a heat gun, and then were heated in an oven at 80° C. for 5 min. Visual examination of the films demonstrated that they were free from large-scale defects.

Ink drytimes were measured as in Example IX. They were:

| | |
|---|---|
| Sample (a)- milled W500: | 4 min. < t < 5 min. |
| Sample (b)- milled, centrifuged W500: | 5 min. < t < 6 min. |
| Sample (c)- Nalco (nonporous) silica: | 6 min. < t < 7 min. |

Thus, the film was dry between 4 and 6 minutes for the porous silica coatings, but took longer to dry for the non-porous silica coating.

Example XI

Improved Capacity

Formulations comprising milled W500, and milled and centrifuged W500 described in Example IX are made at 80 parts pigment and 20 parts binder, and applied to a vinyl substrate and allowed to dry under the conditions described in Example IX. The coating is removed from the substrate and measured for porosity using BJH nitrogen porosimetry. The pore volume measurements show that such coatings have an ink capacity of 10.2 cc per 10 grams of coating. Other coatings can be prepared to have ink capacities in the range of 3 to 50 cc per 10 grams of coating, and all other ranges in between.

A formulation and coating is similarly made with the Nalco colloidal material described in Example IX. The coating is dried, removed from the substrate and porosity for that coating is measured. Such coating has an ink capacity of 2.2 cc per 10 grams and generally such coatings have a capacity of less than 3 cc per 10 grams.

Example XII

Alumina Modification of Finely Divided, Porous Silica Gel

A dispersion of 18% solids was prepared as follows.

434 gms (as is basis) of Syloid 74×6500 were dispersed in 1800 gm DI water. 140 gms of aluminum chlorohydrol (23% by weight $Al_2O_3$) were added with intensive mixing. 10 cc of 2M NaOH were then added. This mixture was wet-milled using a Netzsch LMZ-05 media mill with 0.6–0.8 mm SEPR media. The dispersion was passed through the mill a total of eight times at a flow rate of 0.6 kg/min. The product pH was 3.2, and the particle size was:

| Horiba 900 Particle Size | |
|---|---|
| $D_{10}$ | 0.44 |
| $D_{50}$ | 1.02 |
| $D_{99.9}$ | 7.83 |

The zeta potential for this sample was determined to be about +22 mV using Coulter Delsa 440SX electrophoretic mobility analyzer. The sample was allowed to sit for one month and then redispersed by mixing at 2000 RPM for 2 min. using a 60 mm dia. Cowles blade in a 118 mm diameter container, and the particle size was again measured to be

| Horiba 900 Particle Size | |
|---|---|
| $D_{10}$ | 0.41 |
| $D_{50}$ | 1.09 |
| $D_{99.9}$ | 17.8 |

The particles are thus relatively stable towards irreversible agglomeration at this pH as evidenced by the nearly constant $D_{50}$ values.

Comparison to Example XII

Unmodified Silica Dispersion

By comparison to Example 1, if a silica dispersion is made in the same fashion as above without the alumina source, the charge on the silica particle surface will be negative. If the pH is adjusted to be near the pH of the above dispersion (3–4), the low pH dispersion will irreversibly gel within a matter of a few weeks.

Example XIII

3-Aminopropyltriethoxysilane Modification of Finely Divided, Porous Silica Gel A dispersion of 18% solids was prepared as follows.

50 g (as is basis) of finely divided, porous Syloid 244 silica gel dispersion (20% solids) were acidified (pH= 2.8–3.5) using an 1.0 N hydrochloric acid solution. In a separate container 2.2 ml of 1.0N hydrochloric acid were diluted with 3 mL D.I. water and to that 0.5 g of 3-Aminopropyltriethoxysilane (Dow Corning Z-6011) were added. This silane solution was added to the above porous silica gel slurry. The product pH was 2.8–4.5, and the particle size measured immediately after preparation was:

| | Horiba 900 Particle Size | |
|---|---|---|
| | Starting Porous Silica Dispersion | Treated Porous Silica Dispersions |
| $D_{10}$ | 0.27 | 0.27 |
| $D_{50}$ | 0.48 | 0.47 |
| $D_{99.9}$ | 5.26 | 5.30 |

The zeta potential for the treated sample was determined to be about +40 mV.

Comparison to Example XIII

Unmodified Silica Dispersion

By comparison to Example 2, if a silica dispersion is made in the same fashion as above without the addition of 3-aminopropyltriethoxysilane, the charge on the silica particle surface will be negative. The silica particles are also prone to agglomeration as shown for the particle size measurements seven days after the preparation of the samples:

| | Horiba 900 Particle Size | |
|---|---|---|
| | Starting Porous Silica Dispersion | Treated Porous Silica Dispersion |
| $D_{10}$ | 7.16 | 0.28 |
| $D_{50}$ | 13.1 | 0.48 |
| $D_{99.9}$ | 314.8 | 6.14 |

The particles are thus relatively stable towards irreversible agglomeration at this pH as evidenced by the nearly constant $D_{50}$ values. Four weeks later the untreated sample irreversibly agglomerates to a gel like mass whereas the silane treated example shows particle size distribution similar to the fresh prepared samples.

Example XIV

Ink Jet Coating Formulation Using the 3-Aminopropyltriethoxysilane Modified Porous Silica Dispersion 48.5 g of finely divided, porous silica gel slurry (20.6 wt. % solids) was placed in a container equipped with an overhead stirrer. The slurry was acidified (2.8–3.5) with 1.0 N hydrochloric acid. In a separate container 2.3 ml of 1.0 N hydrochloric acid were diluted with 6.1 mL D.I. water and to that 0.5 g of 3-aminopropyltriethoxysilane (Dow Corning Z-6011) were added. This silane solution was added to the above porous silica gel slurry. To that 30.0 g of a polyvinyl alcohol solution (10 wt. % solids) was added. The pH of the mixture was readjusted to 2.8–3.5 with 1.0 N hydrochloric acid. A solution containing 3.75 g of 261® LV (40 wt. %; Calgon Corp.) diluted with D. I. water (6.0 g) was added to the above mixture. The final pH of the coating formulation was 2.8–3.5. PET transparent films were coated via depositing a 100μ wet film. After drying the resulting coating has a smooth, glossy appearance with very good printability using dye or pigmented inks.

Comparison to Example XIV

Ink Jet Coating Formulation Using Unmodified Porous Silica Dispersion

By comparison to Example 3, if an ink jet formulation is made in a similar fashion as above without the addition of 3-aminopropyltriethoxysilane, agglomeration of silica occurs resulting in a gel like formulation that breaks down only under very high sheer yielding a gritty coating.

Example XV

Polymer Modification of Finely Divided, Porous Silica Gel

A dispersion of 16% solids was prepared as follows.

435 gms (as is basis) of Syloid 221 silica were dispersed in 1800 gm DI water. 100 gms diallyl dimethyl ammonium chloride polymer (Calgon CP261LV, poly [dadmac]) were added with intensive mixing. 10 cc of 3.5 M HCl were then added. This mixture was wet-milled using a Netzsch LMZ-05 media mill with 0.6–0.8 mm SEPR media. The dispersion was passed through the mill for a total of 45 min. at a flow rate of 0.67 L/min., with recycle of mill product into the mill feed tank. The product pH was 3.2, and the particle size was:

| Horiba 900 Particle Size | |
|---|---|
| $D_{10}$ | 0.35 |
| $D_{50}$ | 0.61 |
| $D_{99.9}$ | 4.17 |

Three weeks later, the particle size for this sample was remeasured to be:

| Horiba 900 Particle Size | |
|---|---|
| $D_{10}$ | 0.33 |
| $D_{50}$ | 0.64 |
| $D_{99.9}$ | 4.70 |

The particles are thus relatively stable towards irreversible agglomeration and this pH as evidenced by the nearly constant particle size values.

What is claimed:

1. A dispersion comprising porous inorganic oxide particles having (c) a median particle size in the range of 0.05 to about 3 microns; and (d) porosity such that when an aqueous dispersion of the particles is dried at least about 0.5 cc/g of pore volume as measured by BJH nitrogen porosimetry is from pores having a pore size of 600 Å or smaller;

wherein the inorganic oxide particles have a zeta potential of at least +20 mV and said particles possess a viscosity derived pore volume (PVa) of at least 0.5 cc/g as governed by the relationship:

$$\text{slope}=2.5(1/\rho s+P Va) \rho f$$

where the slope is about 2.4 or greater, $\rho s$ is the particles skeletal density and $\rho f$ is the density of dispersion fluid phase.

2. A dispersion of claim 1, wherein the inorganic oxide particles have a zeta potential of at least +40 mV.

3. A dispersion of claim 1 wherein the inorganic oxide particles are silica particles which have been modified by a member of the group consisting of alumina, cation-containing silane and cationic polyxuer.

4. A dispersion of claim 1, wherein the slope is in the range of 2.4 to 10.0.

5. A dispersion of claim 1, wherein the porous inorganic oxide particles have a viscosity-derived pore volume in the range of about 1.0 to about 1.5 cc/g.

6. A dispersion of claim 1, wherein at least 40% of said viscosity derived pore volume of said dispersion is maintained after said dispersion is dried.

* * * * *